United States Patent
Lee et al.

(10) Patent No.: US 10,861,118 B1
(45) Date of Patent: Dec. 8, 2020

(54) SYSTEMS AND METHODS FOR AUTOMATIC ASSIGNMENT OF FLEXIBLE DELIVERY WORK

(71) Applicant: COUPANG CORP., Seoul (KR)

(72) Inventors: Yulhee Lee, Seoul (KR); Hyeleen Choi, Gyeonggi-do (KR); Jaebong Sung, Gyeonggi-do (KR); Jongwook Lee, Gyeonggi-do (KR)

(73) Assignee: Coupang Corp., Seoul (KR)

( * ) Notice: Subject to any disclaimer, the term of this patent is extended or adjusted under 35 U.S.C. 154(b) by 0 days.

(21) Appl. No.: 16/578,752

(22) Filed: Sep. 23, 2019

(51) Int. Cl.
 *G06Q 50/28* (2012.01)
 *G06Q 10/06* (2012.01)
(52) U.S. Cl.
 CPC ....... *G06Q 50/28* (2013.01); *G06Q 10/06315* (2013.01); *G06Q 10/063114* (2013.01)
(58) Field of Classification Search
 CPC .......................................... G06Q 10/00–50/00
 USPC ................................................ 705/7.11–7.42
 See application file for complete search history.

(56) References Cited

U.S. PATENT DOCUMENTS

| | | | | |
|---|---|---|---|---|
| 5,111,391 A * | 5/1992 | Fields | ..................... | G06Q 10/06 705/7.14 |
| 5,117,353 A * | 5/1992 | Stipanovich | ........... | G06Q 10/06 705/7.14 |
| 5,117,535 A * | 6/1992 | Fehrer | ..................... | D01G 25/00 19/145.7 |
| 5,325,292 A * | 6/1994 | Crockett | ................ | G06Q 10/06 705/7.18 |
| 6,049,776 A * | 4/2000 | Donnelly | ....... | G06Q 10/063112 705/7.14 |
| 6,732,079 B1 * | 5/2004 | Kintner | ............ | G06Q 10/06311 705/7.13 |
| 6,823,315 B1 * | 11/2004 | Bucci | ..................... | G06Q 10/06 705/7.16 |

(Continued)

OTHER PUBLICATIONS

Haughton, Michael A., The efficacy of exclusive territory assignments to delivery vehicle drivers European Journal of Operations Research, vol. 184, 2008 (Year: 2008).*

(Continued)

*Primary Examiner* — Alan S Miller
(74) *Attorney, Agent, or Firm* — Finnegan, Henderson, Farabow, Garrett & Dunner, LLP

(57) ABSTRACT

Disclosed embodiments provide systems and methods related to automatically assigning temporary delivery workers to a delivery task. A method for automatically assigning temporary delivery workers to a delivery task comprises receiving a request to determine delivery tasks for temporary delivery workers from a user device, retrieving delivery tasks needing assignments from a database, each delivery task associated with a delivery location and a volume of parcels, and determining a number of permanent delivery workers needed based on a volume of parcels associated with each delivery task. The method further comprises retrieving permanent delivery workers and temporary delivery workers needing assignments from the database, each delivery worker associated with a feasible volume of delivery parcels, assigning the retrieved permanent delivery workers to the retrieved delivery tasks, assigning the retrieved temporary delivery workers to the retrieved delivery tasks needing assignments after the permanent delivery worker assignments.

20 Claims, 8 Drawing Sheets

(56) References Cited

U.S. PATENT DOCUMENTS

| | | | | |
|---|---|---|---|---|
| 7,313,530 | B2* | 12/2007 | Smith | G06Q 10/04 705/7.24 |
| 7,363,126 | B1* | 4/2008 | Zhong | G01C 21/3484 340/992 |
| 8,306,839 | B2* | 11/2012 | Deich | G06Q 10/06 705/7.13 |
| 8,473,528 | B2* | 6/2013 | Lamm, Sr. | G06Q 10/06 707/813 |
| 2002/0165729 | A1* | 11/2002 | Kuebert | G06Q 10/083 705/338 |
| 2003/0055706 | A1* | 3/2003 | Statfeld | G06Q 10/06 705/7.14 |
| 2005/0021384 | A1* | 1/2005 | Pantaleo | G06Q 10/06 705/7.13 |
| 2008/0147473 | A1* | 6/2008 | Zhong | G06Q 10/08 701/25 |
| 2013/0013369 | A1* | 1/2013 | Deich | G06Q 10/06313 705/7.25 |
| 2014/0279654 | A1* | 9/2014 | Lievens | G06O 10/08355 705/333 |
| 2014/0330738 | A1* | 11/2014 | Falcone | G06Q 10/08355 705/338 |
| 2015/0178678 | A1* | 6/2015 | Carr | G01G 19/002 705/341 |
| 2015/0228004 | A1* | 8/2015 | Bednarek | G06Q 10/08355 705/26.8 |
| 2016/0364823 | A1* | 12/2016 | Cao | G06Q 50/30 |

OTHER PUBLICATIONS

Zhong, Houngsheng et al., Territory Planning and Vehicle Dispatching with Driver Learning Dec. 17, 2004 (Year: 2004).*

Smith, Stephen Leslie, Task Allocation and Vehicle Routing in Dynamic Environments University of California, Sep. 2009 (Year: 2009).*

Bent, Russell W. et al., Scenario-Based Planning for Partially Dynamic Vehicle Routing with Stochastic Customers Operations Research, vol. 52, No. 6, Nov.-Dec. 2004 (Year: 2004).*

Haughton, Michael A., Assigning delivery routes to drivers under variable customer demand Transportation Research Part E, 2007 (Year: 2007).*

Tolvanen, Juha, GIS in Postal Operations Posti, 2017 (Year: 2017).*

Oracle Real-Time Scheduler for Retail Delivery and Logistics Oracle Data Sheet, Oracle Corporation, 2009 (Year: 2009).*

Janssens, Jochen et al., Multi-objective microzone-based vehicle routing for courier companies: from tactical to operational planning, University of Antwerp, Jan. 2014 (Year: 2014).*

Lei, Hontago et al., Districting for routing with stochastic customers European Journal Transportation & Logistics, vol. 1, 2012 (Year: 2012).*

Kovacs, Attila et al., Vehicle Routing Problem in Which Consistency Considerations are Important: A Survey Networks, 2014 (Year: 2014).*

Larsen, Allan, The Dynamic Vehicle Routing Problem IMM, 2000 (Year: 2000).*

Carlson, John G., Dividing territories among several vehicles University of Minnesota, Oct. 29, 2011 (Year: 2011).*

Haugland, Dag et al., Designing delivery districts for the vehicle routing problem with stochastic demands European Journal of Operational Research, vol. 180, 2007 (Year: 2007).*

Descartes.com Web Pages—e-Fulfillment solutions Descartes, Mar. 2000 (Year: 2000).*

Cao, Viet-Cuong, Design a mobile logistics solution utilising modern software and services Hochshule Darmstadt University of Applied Sciences, Aug. 13, 2012 (Year: 2012).*

Kant, Goos et al., Coca-Cola Enterprises Optimizes Vehicle Routes for Efficient Product Delivery Interfaces, vol. 38, No. 1, Jan.-Feb. 2008 (Year: 2008).*

* cited by examiner

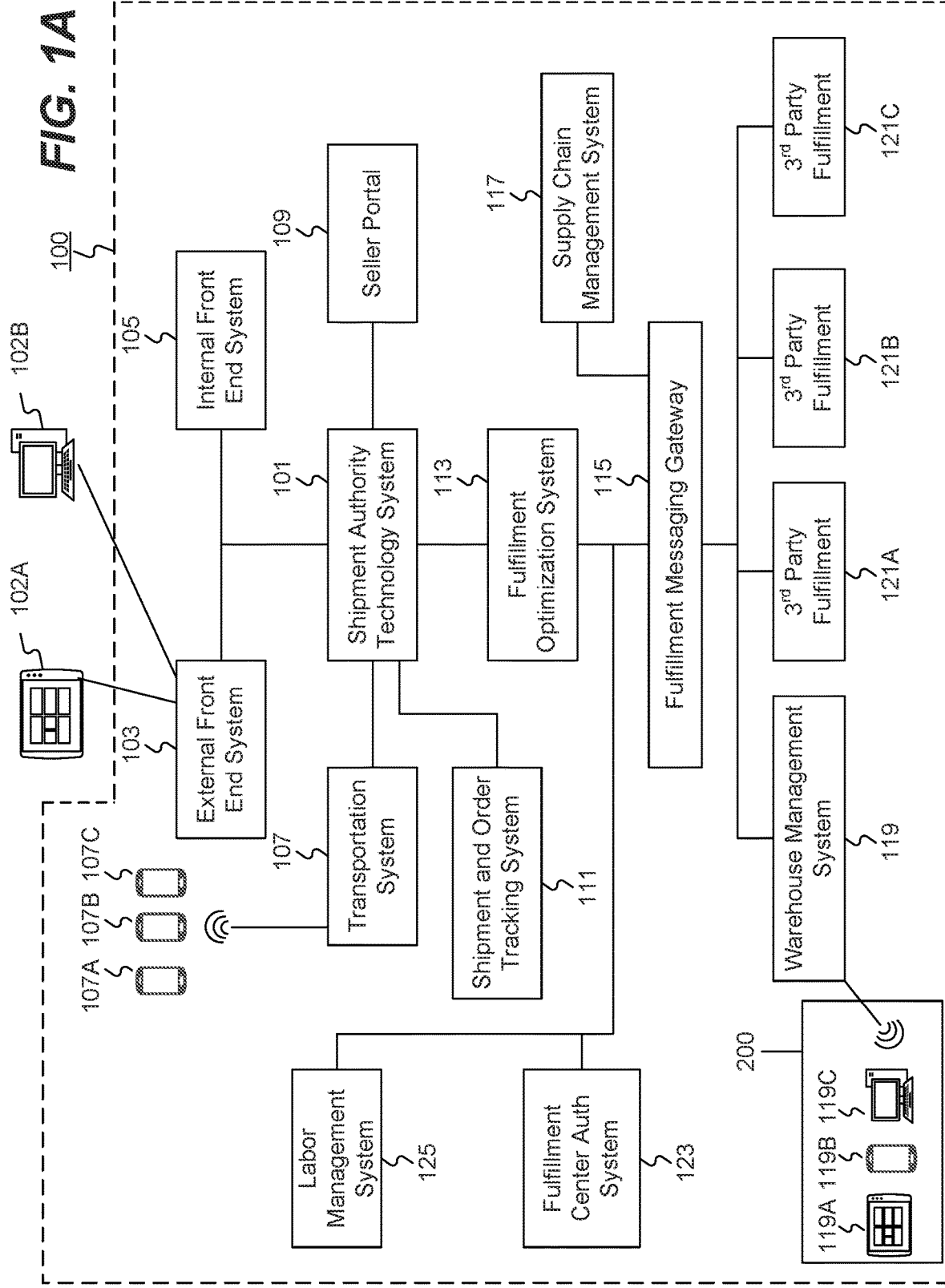

US 10,861,118 B1

SYSTEMS AND METHODS FOR AUTOMATIC ASSIGNMENT OF FLEXIBLE DELIVERY WORK

TECHNICAL FIELD

The present disclosure generally relates to computerized systems and methods for an automatic assignment of delivery task. In particular, embodiments of the present disclosure relate to inventive and unconventional systems relate to an automatic delivery task assignment for temporary delivery workers.

BACKGROUND

Fulfillment centers (FCs) encounter more than millions of products daily as they operate to fulfill consumer orders as soon as the orders are placed and enable delivery workers to pick up shipments. Operations for enabling delivery workers to pick up shipments may include assigning a delivery worker to a delivery task. Although currently existing FCs and systems for assigning workers are configured to handle large volumes of delivery tasks, a common issue arises when a FC receives orders that cannot be handled by delivery workers associated with the FC.

To mitigate such problems, conventional delivery assignment systems may assign temporary delivery workers, for example, workers delivering on an as-needed basis (e.g., seasonally), to perform delivery tasks. While these computerized systems attempt to assign delivery tasks in an efficient manner, the systems relied upon a human user to review a table of expected and actual workload values and determine assignments of temporary delivery workers to a delivery task. For example, a manager in charge of assigning delivery tasks may review an electronic document listing expected and actual workload of delivery tasks, including a volume of parcels for each delivery task, and determine whether or not a temporary delivery worker is required. The manager may then manually assign temporary delivery workers to unassigned tasks.

Therefore, there is a need for improved methods and systems for an automatic delivery task assignment of temporary delivery workers.

SUMMARY

One aspect of the present disclosure is directed to an automatic delivery task assignment method for temporary delivery workers. The method may comprise operations. The operations comprise receiving a request to determine delivery tasks for temporary delivery workers from a user device, retrieving delivery tasks needing assignments from a database, each delivery task associated with a delivery location and a volume of parcels, and determining a number of permanent delivery workers needed based on a volume of parcels associated with each delivery task. The operations may further comprise retrieving permanent delivery workers and temporary delivery workers needing assignments from the database, each delivery worker associated with a feasible volume of delivery parcels, assigning the retrieved permanent delivery workers to the retrieved delivery tasks, and assigning the retrieved temporary delivery workers to the retrieved delivery tasks needing assignments after the permanent delivery worker assignments.

Another aspect of the present disclosure is directed to an automatic delivery task assignment system for temporary delivery workers. The automatic delivery task assignment system may include one or more memory devices storing instructions. The self-assignment system may also include one or more processors configured to execute the instructions to perform operations as discussed above.

Yet another aspect of the present disclosure is directed to a non-transitory computer-readable medium storing instructions to execute a method by a processor to automatically assign temporary delivery workers to a delivery task. The method comprises performing operations as discussed above.

Other systems, methods, and computer-readable media are also discussed herein.

BRIEF DESCRIPTION OF THE DRAWINGS

FIG. 1A is a schematic block diagram illustrating an exemplary embodiment of a network comprising computerized systems for communications enabling shipping, transportation, and logistics operations, consistent with the disclosed embodiments.

DETAILED DESCRIPTION

Figure 1B:
FIG. 1B depicts a sample Search Result Page (SRP) that includes one or more search results satisfying a search request along with interactive user interface elements, consistent with the disclosed embodiments.
Figure 1C:
FIG. 1C depicts a sample Single Display Page (SDP) that includes a product and information about the product along with interactive user interface elements, consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components and steps illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope of the invention is defined by the appended claims.

Embodiments of the present disclosure are directed to an automatic systems and methods configured for assigning a temporary delivery worker to a delivery task. The disclosed embodiments provide innovative technical features that allow for automated temporary delivery worker assignment based on a volume of delivery parcels and an availability of permanent delivery workers. For example, the disclosed embodiments enable transmission of a request for a delivery tasks assignment, enable determination of a number of permanent delivery workers needed for each delivery task, enable delivery assignment of permanent delivery workers, and enable automatic delivery assignment of temporary delivery workers.

Referring to FIG. 1A, a schematic block diagram 100 illustrating an exemplary embodiment of a system comprising computerized systems for communications enabling shipping, transportation, and logistics operations is shown. As illustrated in FIG. 1A, system 100 may include a variety of systems, each of which may be connected to one another via one or more networks. The systems may also be connected to one another via a direct connection, for example, using a cable. The depicted systems include a shipment authority technology (SAT) system 101, an external front end system 103, an internal front end system 105, a transportation system 107, mobile devices 107A, 107B, and 107C, seller portal 109, shipment and order tracking (SOT) system 111, fulfillment optimization (FO) system 113, fulfillment messaging gateway (FMG) 115, supply chain management (SCM) system 117, warehouse management system 119, mobile devices 119A, 119B, and 119C (depicted as being inside of fulfillment center (FC) 200), 3$^{rd}$ party fulfillment systems 121A, 121B, and 121C, fulfillment center authorization system (FC Auth) 123, and labor management system (LMS) 125.

SAT system 101, in some embodiments, may be implemented as a computer system that monitors order status and delivery status. For example, SAT system 101 may determine whether an order is past its Promised Delivery Date (PDD) and may take appropriate action, including initiating a new order, reshipping the items in the non-delivered order, canceling the non-delivered order, initiating contact with the ordering customer, or the like. SAT system 101 may also monitor other data, including output (such as a number of packages shipped during a particular time period) and input (such as the number of empty cardboard boxes received for use in shipping). SAT system 101 may also act as a gateway between different devices in system 100, enabling communication (e.g., using store-and-forward or other techniques) between devices such as external front end system 103 and FO system 113.

External front end system 103, in some embodiments, may be implemented as a computer system that enables external users to interact with one or more systems in system 100. For example, in embodiments where system 100 enables the presentation of systems to enable users to place an order for an item, external front end system 103 may be implemented as a web server that receives search requests, presents item pages, and solicits payment information. For example, external front end system 103 may be implemented as a computer or computers running software such as the Apache HTTP Server, Microsoft Internet Information Services (IIS), NGINX, or the like. In other embodiments, external front end system 103 may run custom web server software designed to receive and process requests from external devices (e.g., mobile device 102A or computer 102B), acquire information from databases and other data stores based on those requests, and provide responses to the received requests based on acquired information.

In some embodiments, external front end system 103 may include one or more of a web caching system, a database, a search system, or a payment system. In one aspect, external front end system 103 may comprise one or more of these systems, while in another aspect, external front end system 103 may comprise interfaces (e.g., server-to-server, database-to-database, or other network connections) connected to one or more of these systems.

An illustrative set of steps, illustrated by FIGS. 1B, 1C, 1D, and 1E, will help to describe some operations of external front end system 103. External front end system 103 may receive information from systems or devices in system 100 for presentation and/or display. For example, external front end system 103 may host or provide one or more web pages, including a Search Result Page (SRP) (e.g., FIG. 1B), a Single Detail Page (SDP) (e.g., FIG. 1C), a Cart page (e.g., FIG. 1D), or an Order page (e.g., FIG. 1E). A user device (e.g., using mobile device 102A or computer 102B) may navigate to external front end system 103 and request a search by entering information into a search box. External front end system 103 may request information from one or more systems in system 100. For example, external front end system 103 may request information from FO System 113 that satisfies the search request. External front end system 103 may also request and receive (from FO System 113) a Promised Delivery Date or "PDD" for each product included in the search results. The PDD, in some embodiments, may represent an estimate of when a package containing the product will arrive at the user's desired location or a date by which the product is promised to be delivered at the user's desired location if ordered within a particular period of time, for example, by the end of the day (11:59 PM). (PDD is discussed further below with respect to FO System 113.)

External front end system 103 may prepare an SRP (e.g., FIG. 1B) based on the information. The SRP may include information that satisfies the search request. For example, this may include pictures of products that satisfy the search request. The SRP may also include respective prices for each product, or information relating to enhanced delivery options for each product, PDD, weight, size, offers, discounts, or the like. External front end system 103 may send the SRP to the requesting user device (e.g., via a network).

A user device may then select a product from the SRP, e.g., by clicking or tapping a user interface, or using another input device, to select a product represented on the SRP. The user device may formulate a request for information on the selected product and send it to external front end system 103. In response, external front end system 103 may request information related to the selected product. For example, the information may include additional information beyond that presented for a product on the respective SRP. This could include, for example, shelf life, country of origin, weight, size, number of items in package, handling instructions, or other information about the product. The information could also include recommendations for similar products (based on, for example, big data and/or machine learning analysis of customers who bought this product and at least one other product), answers to frequently asked questions, reviews from customers, manufacturer information, pictures, or the like.

External front end system 103 may prepare an SDP (Single Detail Page) (e.g., FIG. 1C) based on the received product information. The SDP may also include other interactive elements such as a "Buy Now" button, a "Add to Cart" button, a quantity field, a picture of the item, or the like. The SDP may further include a list of sellers that offer the product. The list may be ordered based on the price each seller offers such that the seller that offers to sell the product at the lowest price may be listed at the top. The list may also be ordered based on the seller ranking such that the highest ranked seller may be listed at the top. The seller ranking may be formulated based on multiple factors, including, for example, the seller's past track record of meeting a promised PDD. External front end system 103 may deliver the SDP to the requesting user device (e.g., via a network).

The requesting user device may receive the SDP which lists the product information. Upon receiving the SDP, the user device may then interact with the SDP. For example, a user of the requesting user device may click or otherwise interact with a "Place in Cart" button on the SDP. This adds the product to a shopping cart associated with the user. The user device may transmit this request to add the product to the shopping cart to external front end system 103.

Figure 1D:
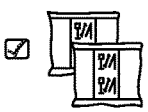
FIG. 1D depicts a sample Cart page that includes items in a virtual shopping cart along with interactive user interface elements, consistent with the disclosed embodiments.
Figure 1E:
FIG. 1E depicts a sample Order page that includes items from the virtual shopping cart along with information regarding purchase and shipping, along with interactive user interface elements, consistent with the disclosed embodiments.

External front end system 103 may generate a Cart page (e.g., FIG. 1D). The Cart page, in some embodiments, lists the products that the user has added to a virtual "shopping cart." A user device may request the Cart page by clicking on or otherwise interacting with an icon on the SRP, SDP, or other pages. The Cart page may, in some embodiments, list all products that the user has added to the shopping cart, as well as information about the products in the cart such as a quantity of each product, a price for each product per item, a price for each product based on an associated quantity, information regarding PDD, a delivery method, a shipping cost, user interface elements for modifying the products in the shopping cart (e.g., deletion or modification of a quantity), options for ordering other product or setting up periodic delivery of products, options for setting up interest payments, user interface elements for proceeding to purchase, or the like. A user at a user device may click on or otherwise interact with a user interface element (e.g., a button that reads "Buy Now") to initiate the purchase of the product in the shopping cart. Upon doing so, the user device may transmit this request to initiate the purchase to external front end system 103.

External front end system 103 may generate an Order page (e.g., FIG. 1E) in response to receiving the request to initiate a purchase. The Order page, in some embodiments, re-lists the items from the shopping cart and requests input of payment and shipping information. For example, the Order page may include a section requesting information about the purchaser of the items in the shopping cart (e.g., name, address, e-mail address, phone number), information about the recipient (e.g., name, address, phone number, delivery information), shipping information (e.g., speed/method of delivery and/or pickup), payment information (e.g., credit card, bank transfer, check, stored credit), user interface elements to request a cash receipt (e.g., for tax purposes), or the like. External front end system 103 may send the Order page to the user device.

The user device may enter information on the Order page and click or otherwise interact with a user interface element that sends the information to external front end system 103. From there, external front end system 103 may send the information to different systems in system 100 to enable the creation and processing of a new order with the products in the shopping cart.

In some embodiments, external front end system 103 may be further configured to enable sellers to transmit and receive information relating to orders.

Internal front end system 105, in some embodiments, may be implemented as a computer system that enables internal users (e.g., employees of an organization that owns, operates, or leases system 100) to interact with one or more systems in system 100. For example, in embodiments where network 101 enables the presentation of systems to enable users to place an order for an item, internal front end system 105 may be implemented as a web server that enables internal users to view diagnostic and statistical information about orders, modify item information, or review statistics relating to orders. For example, internal front end system 105 may be implemented as a computer or computers running software such as the Apache HTTP Server, Microsoft Internet Information Services (IIS), NGINX, or the like. In other embodiments, internal front end system 105 may run custom web server software designed to receive and process requests from systems or devices depicted in system 100 (as well as other devices not depicted), acquire information from databases and other data stores based on those requests, and provide responses to the received requests based on acquired information.

In some embodiments, internal front end system 105 may include one or more of a web caching system, a database, a search system, a payment system, an analytics system, an order monitoring system, or the like. In one aspect, internal front end system 105 may comprise one or more of these systems, while in another aspect, internal front end system 105 may comprise interfaces (e.g., server-to-server, database-to-database, or other network connections) connected to one or more of these systems.

Transportation system 107, in some embodiments, may be implemented as a computer system that enables communication between systems or devices in system 100 and mobile devices 107A-107C. Transportation system 107, in some embodiments, may receive information from one or more mobile devices 107A-107C (e.g., mobile phones, smart phones, PDAs, or the like). For example, in some embodiments, mobile devices 107A-107C may comprise devices operated by delivery workers. The delivery workers, who may be permanent, temporary, or shift employees, may utilize mobile devices 107A-107C to effect delivery of packages containing the products ordered by users. For example, to deliver a package, the delivery worker may receive a notification on a mobile device indicating which package to deliver and where to deliver it. Upon arriving at the delivery location, the delivery worker may locate the package (e.g., in the back of a truck or in a crate of packages), scan or otherwise capture data associated with an identifier on the package (e.g., a barcode, an image, a text string, an RFID tag, or the like) using the mobile device, and deliver the package (e.g., by leaving it at a front door, leaving it with a security guard, handing it to the recipient, or the like). In some embodiments, the delivery worker may capture photo(s) of the package and/or may obtain a signature using the mobile device. The mobile device may send information to transportation system 107 including information about the delivery, including, for example, time, date, GPS location, photo(s), an identifier associated with the delivery worker, an identifier associated with the mobile device, or the like. Transportation system 107 may store this information in a database (not pictured) for access by other systems in system 100. Transportation system 107 may, in some embodiments, use this information to prepare and send tracking data to other systems indicating the location of a particular package.

In some embodiments, certain users may use one kind of mobile device (e.g., permanent workers may use a specialized PDA with custom hardware such as a barcode scanner, stylus, and other devices) while other users may use other kinds of mobile devices (e.g., temporary or shift workers may utilize off-the-shelf mobile phones and/or smartphones).

In some embodiments, transportation system 107 may associate a user with each device. For example, transportation system 107 may store an association between a user (represented by, e.g., a user identifier, an employee identifier, or a phone number) and a mobile device (represented by, e.g., an International Mobile Equipment Identity (IMEI), an International Mobile Subscription Identifier (IMSI), a phone number, a Universal Unique Identifier (UUID), or a Globally Unique Identifier (GUID)). Transportation system 107 may use this association in conjunction with data received on deliveries to analyze data stored in the database in order to determine, among other things, a location of the worker, an efficiency of the worker, or a speed of the worker.

Seller portal 109, in some embodiments, may be implemented as a computer system that enables sellers or other external entities to electronically communicate with one or more systems in system 100. For example, a seller may utilize a computer system (not pictured) to upload or provide product information, order information, contact information, or the like, for products that the seller wishes to sell through system 100 using seller portal 109.

Shipment and order tracking system 111, in some embodiments, may be implemented as a computer system that receives, stores, and forwards information regarding the location of packages containing products ordered by customers (e.g., by a user using devices 102A-102B). In some embodiments, shipment and order tracking system 111 may request or store information from web servers (not pictured) operated by shipping companies that deliver packages containing products ordered by customers.

In some embodiments, shipment and order tracking system 111 may request and store information from systems depicted in system 100. For example, shipment and order tracking system 111 may request information from transportation system 107. As discussed above, transportation system 107 may receive information from one or more mobile devices 107A-107C (e.g., mobile phones, smart phones, PDAs, or the like) that are associated with one or more of a user (e.g., a delivery worker) or a vehicle (e.g., a delivery truck). In some embodiments, shipment and order tracking system 111 may also request information from warehouse management system (WMS) 119 to determine the location of individual products inside of a fulfillment center (e.g., fulfillment center 200). Shipment and order tracking system 111 may request data from one or more of transportation system 107 or WMS 119, process it, and present it to a device (e.g., user devices 102A and 102B) upon request.

Fulfillment optimization (FO) system 113, in some embodiments, may be implemented as a computer system that stores information for customer orders from other systems (e.g., external front end system 103 and/or shipment and order tracking system 111). FO system 113 may also store information describing where particular items are held or stored. For example, certain items may be stored only in one fulfillment center, while certain other items may be stored in multiple fulfillment centers. In still other embodiments, certain fulfillment centers may be designed to store only a particular set of items (e.g., fresh produce or frozen products). FO system 113 stores this information as well as associated information (e.g., quantity, size, date of receipt, expiration date, etc.).

FO system 113 may also calculate a corresponding PDD (promised delivery date) for each product. The PDD, in some embodiments, may be based on one or more factors. For example, FO system 113 may calculate a PDD for a product based on a past demand for a product (e.g., how many times that product was ordered during a period of time), an expected demand for a product (e.g., how many customers are forecast to order the product during an upcoming period of time), a network-wide past demand indicating how many products were ordered during a period of time, a network-wide expected demand indicating how many products are expected to be ordered during an upcoming period of time, one or more counts of the product stored in each fulfillment center 200, which fulfillment center stores each product, expected or current orders for that product, or the like.

In some embodiments, FO system 113 may determine a PDD for each product on a periodic basis (e.g., hourly) and store it in a database for retrieval or sending to other systems (e.g., external front end system 103, SAT system 101, shipment and order tracking system 111). In other embodiments, FO system 113 may receive electronic requests from one or more systems (e.g., external front end system 103, SAT system 101, shipment and order tracking system 111) and calculate the PDD on demand.

Fulfillment messaging gateway (FMG) 115, in some embodiments, may be implemented as a computer system that receives a request or response in one format or protocol from one or more systems in system 100, such as FO system 113, converts it to another format or protocol, and forward it in the converted format or protocol to other systems, such as WMS 119 or $3^{rd}$ party fulfillment systems 121A, 121B, or 121C, and vice versa.

Supply chain management (SCM) system 117, in some embodiments, may be implemented as a computer system that performs forecasting functions. For example, SCM system 117 may forecast a level of demand for a particular product based on, for example, based on a past demand for products, an expected demand for a product, a network-wide past demand, a network-wide expected demand, a count products stored in each fulfillment center 200, expected or current orders for each product, or the like. In response to this forecasted level and the amount of each product across all fulfillment centers, SCM system 117 may generate one or more purchase orders to purchase and stock a sufficient quantity to satisfy the forecasted demand for a particular product.

Warehouse management system (WMS) 119, in some embodiments, may be implemented as a computer system that monitors workflow. For example, WMS 119 may receive event data from individual devices (e.g., devices 107A-107C or 119A-119C) indicating discrete events. For example, WMS 119 may receive event data indicating the use of one of these devices to scan a package. As discussed below with respect to fulfillment center 200 and FIG. 2, during the fulfillment process, a package identifier (e.g., a barcode or RFID tag data) may be scanned or read by machines at particular stages (e.g., automated or handheld barcode scanners, RFID readers, high-speed cameras, devices such as tablet 119A, mobile device/PDA 119B, computer 119C, or the like). WMS 119 may store each event indicating a scan or a read of a package identifier in a corresponding database (not pictured) along with the package identifier, a time, date, location, user identifier, or other information, and may provide this information to other systems (e.g., shipment and order tracking system 111).

WMS 119, in some embodiments, may store information associating one or more devices (e.g., devices 107A-107C or 119A-119C) with one or more users associated with system 100. For example, in some situations, a user (such as a part- or full-time employee) may be associated with a mobile device in that the user owns the mobile device (e.g., the mobile device is a smartphone). In other situations, a user may be associated with a mobile device in that the user is temporarily in custody of the mobile device (e.g., the user checked the mobile device out at the start of the day, will use it during the day, and will return it at the end of the day).

WMS 119, in some embodiments, may maintain a work log for each user associated with system 100. For example, WMS 119 may store information associated with each employee, including any assigned processes (e.g., unloading trucks, picking items from a pick zone, rebin wall work, packing items), a user identifier, a location (e.g., a floor or zone in a fulfillment center 200), a number of units moved through the system by the employee (e.g., number of items picked, number of items packed), an identifier associated with a device (e.g., devices 119A-119C), or the like. In some embodiments, WMS 119 may receive check-in and check-out information from a timekeeping system, such as a timekeeping system operated on a device 119A-119C.

$3^{rd}$ party fulfillment (3PL) systems 121A-121C, in some embodiments, represent computer systems associated with third-party providers of logistics and products. For example, while some products are stored in fulfillment center 200 (as discussed below with respect to FIG. 2), other products may be stored off-site, may be produced on demand, or may be otherwise unavailable for storage in fulfillment center 200. 3PL systems 121A-121C may be configured to receive orders from FO system 113 (e.g., through FMG 115) and may provide products and/or services (e.g., delivery or installation) to customers directly. In some embodiments, one or more of 3PL systems 121A-121C may be part of system 100, while in other embodiments, one or more of 3PL systems 121A-121C may be outside of system 100 (e.g., owned or operated by a third-party provider).

Fulfillment Center Auth system (FC Auth) 123, in some embodiments, may be implemented as a computer system with a variety of functions. For example, in some embodiments, FC Auth 123 may act as a single-sign on (SSO) service for one or more other systems in system 100. For example, FC Auth 123 may enable a user to log in via internal front end system 105, determine that the user has similar privileges to access resources at shipment and order tracking system 111, and enable the user to access those privileges without requiring a second log in process. FC Auth 123, in other embodiments, may enable users (e.g., employees) to associate themselves with a particular task. For example, some employees may not have an electronic device (such as devices 119A-119C) and may instead move from task to task, and zone to zone, within a fulfillment center 200, during the course of a day. FC Auth 123 may be configured to enable those employees to indicate what task they are performing and what zone they are in at different times of day.

Labor management system (LMS) 125, in some embodiments, may be implemented as a computer system that stores attendance and overtime information for employees (including full-time and part-time employees). For example, LMS 125 may receive information from FC Auth 123, WMS 119, devices 119A-119C, transportation system 107, and/or devices 107A-107C.

The particular configuration depicted in FIG. 1A is an example only. For example, while FIG. 1A depicts FC Auth system 123 connected to FO system 113, not all embodiments require this particular configuration. Indeed, in some embodiments, the systems in system 100 may be connected to one another through one or more public or private networks, including the Internet, an Intranet, a WAN (Wide-Area Network), a MAN (Metropolitan-Area Network), a wireless network compliant with the IEEE 802.11a/b/g/n Standards, a leased line, or the like. In some embodiments, one or more of the systems in system 100 may be implemented as one or more virtual servers implemented at a data center, server farm, or the like.

Figure 2:
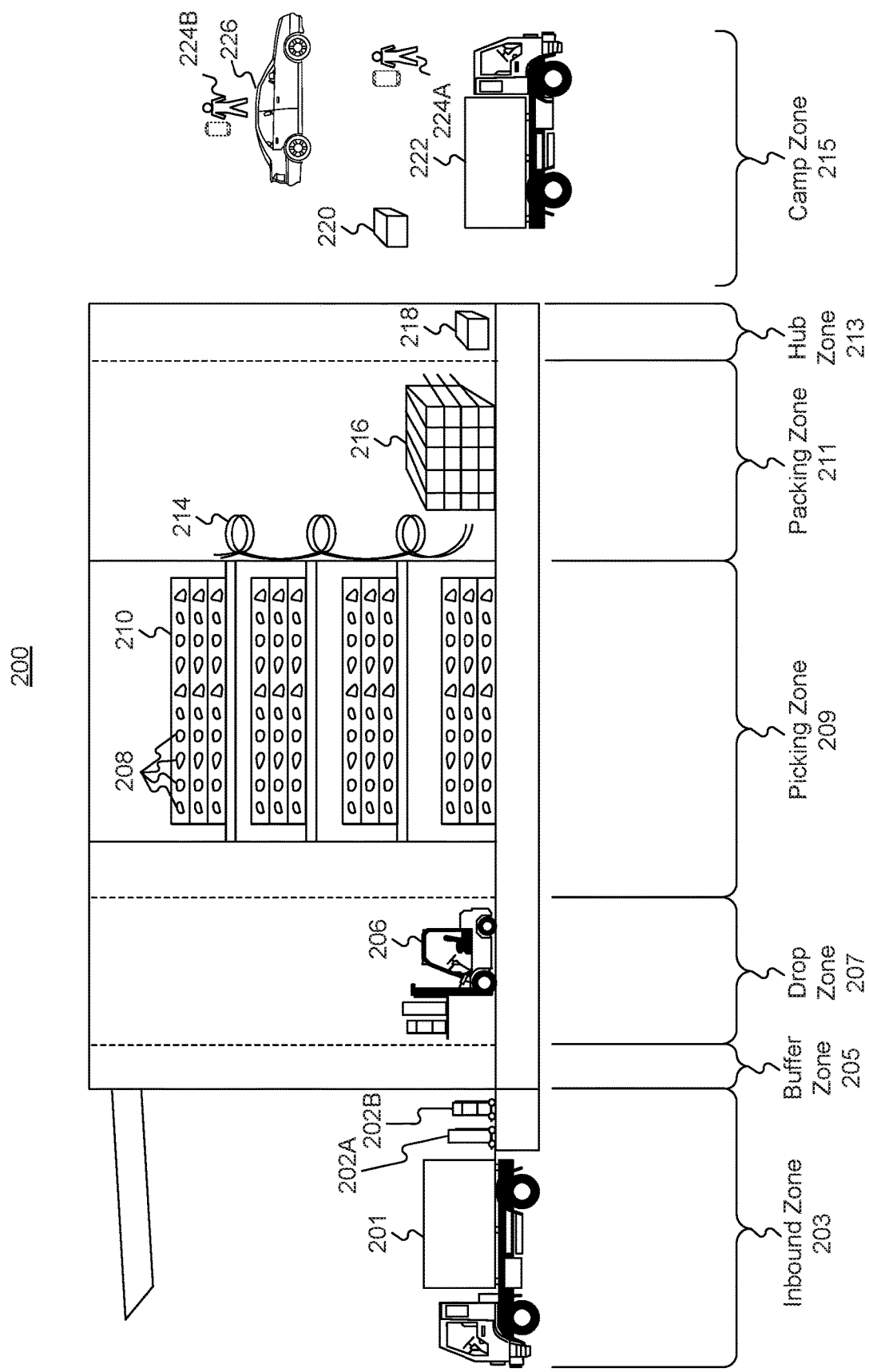
FIG. 2 is a diagrammatic illustration of an exemplary fulfillment center configured to utilize disclosed computerized systems, consistent with the disclosed embodiments.

FIG. 2 depicts a fulfillment center 200. Fulfillment center 200 is an example of a physical location that stores items for shipping to customers when ordered. Fulfillment center (FC) 200 may be divided into multiple zones, each of which are depicted in FIG. 2. These "zones," in some embodiments, may be thought of as virtual divisions between different stages of a process of receiving items, storing the items, retrieving the items, and shipping the items. So, while the "zones" are depicted in FIG. 2, other divisions of zones are possible, and the zones in FIG. 2 may be omitted, duplicated, or modified in some embodiments.

Inbound zone 203 represents an area of FC 200 where items are received from sellers who wish to sell products using system 100 from FIG. 1A. For example, a seller may deliver items 202A and 202B using truck 201. Item 202A may represent a single item large enough to occupy its own shipping pallet, while item 202B may represent a set of items that are stacked together on the same pallet to save space.

A worker will receive the items in inbound zone 203 and may optionally check the items for damage and correctness using a computer system (not pictured). For example, the worker may use a computer system to compare the quantity of items 202A and 202B to an ordered quantity of items. If the quantity does not match, that worker may refuse one or more of items 202A or 202B. If the quantity does match, the worker may move those items (using, e.g., a dolly, a handtruck, a forklift, or manually) to buffer zone 205. Buffer zone 205 may be a temporary storage area for items that are not currently needed in the picking zone, for example, because there is a high enough quantity of that item in the picking zone to satisfy forecasted demand. In some embodiments, forklifts 206 operate to move items around buffer zone 205 and between inbound zone 203 and drop zone 207. If there is a need for items 202A or 202B in the picking zone (e.g., because of forecasted demand), a forklift may move items 202A or 202B to drop zone 207.

Drop zone 207 may be an area of FC 200 that stores items before they are moved to picking zone 209. A worker assigned to the picking task (a "picker") may approach items 202A and 202B in the picking zone, scan a barcode for the picking zone, and scan barcodes associated with items 202A and 202B using a mobile device (e.g., device 119B). The picker may then take the item to picking zone 209 (e.g., by placing it on a cart or carrying it).

Picking zone 209 may be an area of FC 200 where items 208 are stored on storage units 210. In some embodiments, storage units 210 may comprise one or more of physical shelving, bookshelves, boxes, totes, refrigerators, freezers, cold stores, or the like. In some embodiments, picking zone 209 may be organized into multiple floors. In some embodiments, workers or machines may move items into picking zone 209 in multiple ways, including, for example, a forklift, an elevator, a conveyor belt, a cart, a handtruck, a dolly, an automated robot or device, or manually. For example, a picker may place items 202A and 202B on a handtruck or cart in drop zone 207 and walk items 202A and 202B to picking zone 209.

A picker may receive an instruction to place (or "stow") the items in particular spots in picking zone 209, such as a particular space on a storage unit 210. For example, a picker may scan item 202A using a mobile device (e.g., device 119B). The device may indicate where the picker should stow item 202A, for example, using a system that indicate an aisle, shelf, and location. The device may then prompt the picker to scan a barcode at that location before stowing item 202A in that location. The device may send (e.g., via a wireless network) data to a computer system such as WMS 119 in FIG. 1A indicating that item 202A has been stowed at the location by the user using device 1198.

Once a user places an order, a picker may receive an instruction on device 1198 to retrieve one or more items 208 from storage unit 210. The picker may retrieve item 208, scan a barcode on item 208, and place it on transport mechanism 214. While transport mechanism 214 is represented as a slide, in some embodiments, transport mechanism may be implemented as one or more of a conveyor belt, an elevator, a cart, a forklift, a handtruck, a dolly, a cart, or the like. Item 208 may then arrive at packing zone 211.

Packing zone 211 may be an area of FC 200 where items are received from picking zone 209 and packed into boxes or bags for eventual shipping to customers. In packing zone 211, a worker assigned to receiving items (a "rebin worker") will receive item 208 from picking zone 209 and determine what order it corresponds to. For example, the rebin worker may use a device, such as computer 119C, to scan a barcode on item 208. Computer 119C may indicate visually which order item 208 is associated with. This may include, for example, a space or "cell" on a wall 216 that corresponds to an order. Once the order is complete (e.g., because the cell contains all items for the order), the rebin worker may indicate to a packing worker (or "packer") that the order is complete. The packer may retrieve the items from the cell and place them in a box or bag for shipping. The packer may then send the box or bag to a hub zone 213, e.g., via forklift, cart, dolly, handtruck, conveyor belt, manually, or otherwise.

Hub zone 213 may be an area of FC 200 that receives all boxes or bags ("packages") from packing zone 211. Workers and/or machines in hub zone 213 may retrieve package 218 and determine which portion of a delivery area each package is intended to go to, and route the package to an appropriate camp zone 215. For example, if the delivery area has two smaller sub-areas, packages will go to one of two camp zones 215. In some embodiments, a worker or machine may scan a package (e.g., using one of devices 119A-119C) to determine its eventual destination. Routing the package to camp zone 215 may comprise, for example, determining a portion of a geographical area that the package is destined for (e.g., based on a postal code) and determining a camp zone 215 associated with the portion of the geographical area.

Camp zone 215, in some embodiments, may comprise one or more buildings, one or more physical spaces, or one or more areas, where packages are received from hub zone 213 for sorting into routes and/or sub-routes. In some embodiments, camp zone 215 is physically separate from FC 200 while in other embodiments camp zone 215 may form a part of FC 200.

Workers and/or machines in camp zone 215 may determine which route and/or sub-route a package 220 should be associated with, for example, based on a comparison of the destination to an existing route and/or sub-route, a calculation of workload for each route and/or sub-route, the time of day, a shipping method, the cost to ship the package 220, a PDD associated with the items in package 220, or the like. In some embodiments, a worker or machine may scan a package (e.g., using one of devices 119A-119C) to determine its eventual destination. Once package 220 is assigned to a particular route and/or sub-route, a worker and/or machine may move package 220 to be shipped. In exemplary FIG. 2, camp zone 215 includes a truck 222, a car 226, and delivery workers 224A and 224B. In some embodiments, truck 222 may be driven by delivery worker 224A, where delivery worker 224A is a full-time employee that delivers packages for FC 200 and truck 222 is owned, leased, or operated by the same company that owns, leases, or operates FC 200. In some embodiments, car 226 may be driven by delivery worker 224B, where delivery worker 224B is a "flex" or occasional worker that is delivering on an as-needed basis (e.g., seasonally). Car 226 may be owned, leased, or operated by delivery worker 224B.

According to an aspect of the present disclosure, computer-implemented system for providing a delivery assignment may comprise one or more memory devices storing instructions, and one or more processors configured to execute the instructions to perform operations. In some embodiments, the disclosed functionality and systems may be implemented as part of one or more of transportation system 107 or SAT system 101. The preferred embodiment comprises implementing the disclosed functionality and systems on transportation system 107, but one of ordinary skill will understand that other implementations are possible.

Figure 3:
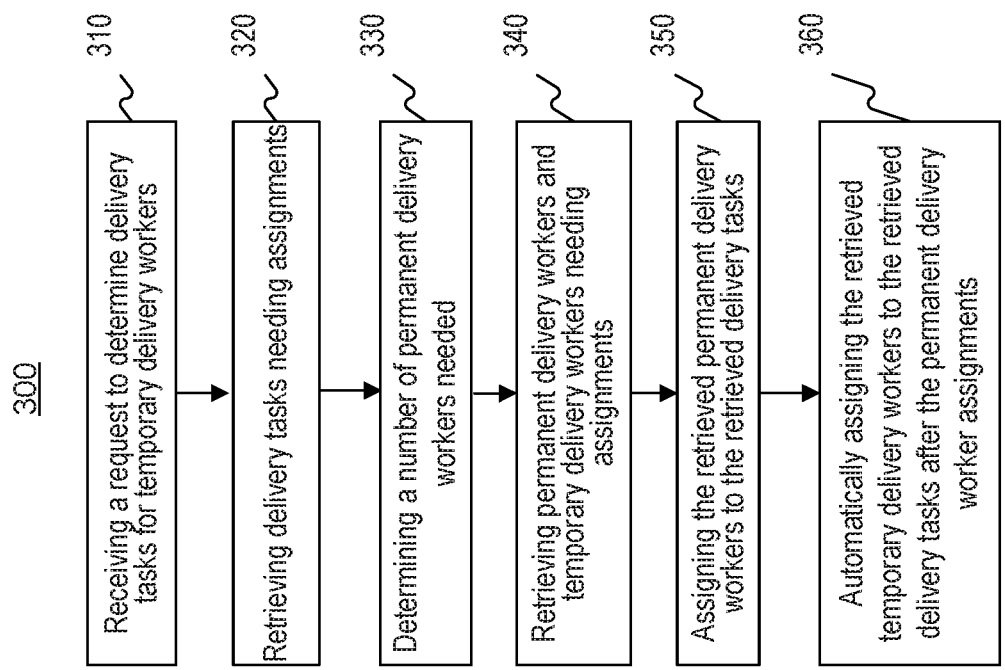
FIG. 3 is an exemplary flow chart of process for automatically assigning delivery tasks to occasional delivery workers, consistent with the disclosed embodiments.

FIG. 3 is an exemplary flow chart of process 300 for automatically assigning delivery tasks to occasional delivery workers, consistent with the disclosed embodiments. This exemplary process is provided by way of example. Process 300 shown in FIG. 3 can be executed or otherwise performed by one or more combinations of various systems, but the preferred embodiment comprises executing process 300 on transportation system 107. Each block shown in FIG. 3 represents one or more processes, methods, or subroutines in the exemplary method 300. Referring to FIG. 3, exemplary method 300 may begin at block 310.

In step 310, transportation system 107 may receive a request to determine delivery tasks for occasional delivery workers from a user device (not pictured). The user device is associated with a worker in charge of assigning delivery tasks. For example, a worker requesting delivery task assignments for occasional workers 224B may include a manager associated with a fulfillment center 200. The request may be transmitted from internal front end system 105. The internal front end system 105, as discussed above with respect to FIG. 1A, may enable internal users (e.g., employees of an organization) to interact with one or more systems in system 100.

In step 320, transportation system 107 may retrieve delivery tasks needing assignments from a database (not pictured) storing the delivery tasks as discussed above with respect to FIG. 1A. The database is described above as a database storing information from transportation system 107 for access by other systems in network 100. Each of the retrieved delivery tasks may comprise a delivery location and a volume of parcels. The delivery location may comprise one or more neighboring delivery destinations, wherein each destination is associated with a volume of parcels. For example, delivery destinations may comprise one or more units in an apartment complex. Transportation system 107 may determine a delivery task based on a delivery destination associated with each delivery parcel. For example, transportation system 107 may group delivery parcels with same or close postal code and assign the grouped parcels to a delivery task. Determination of delivery tasks may further include considering a calculation of workload for each delivery task, a time of day, a shipping method, a cost to ship the parcel, a PDD associated with the parcels, or the like.

In step 330, transportation system 107 may determine a number of permanent delivery workers 224A needed. Transportation system 107 may determine the number of permanent delivery workers 224A needed by dividing a volume of parcels associated with each delivery task by a feasible volume of delivery parcels associated with a permanent worker 224A. The feasible volume is identical for all permanent workers 224A. For example, if a volume of parcels associated with a delivery task is 180 and a feasible volume of parcels that each permanent worker 224A can handle is 50, then four permanent workers are needed to deliver parcels associated with the delivery task. By way of further example, transportation system 107 may adjust permanent workers needed to three since it is more efficient to assign 30 remaining parcels to occasional delivery workers.

In step 340, transportation system 107 may retrieve permanent delivery workers 224A and occasional delivery workers 224B needing assignments from the database (not pictured). The transportation system 107, as discussed above with respect to FIG. 1A, may receive a communication from mobile device 107A-C including information about the delivery, including, for example, an identifier associated with the delivery worker and store the information in a database (not pictured). The identifier may include an indicator providing status of delivery task assignment associated with the delivery worker. The occasional delivery workers 224B may request a delivery task by using an associated mobile device 107A-C. Transportation system 107 may receive a delivery task request from the occasional delivery worker 224B and store information associated with the occasional delivery worker 224B in a database as described above. The delivery request may include a desired delivery location and a desired volume of delivery parcels.

Transportation system 107 may classify occasional delivery workers 224B with a status of loyal, new, or rolling. The status may relate to a priority in receiving delivery tasks for occasional delivery workers 224B. Transportation system 107 may assign a loyal status occasional delivery worker to a delivery task before assigning a new status occasional delivery worker, wherein the new status occasional delivery worker is assigned to a delivery task before a rolling status occasional delivery worker. Occasional delivery worker 224B may obtain a loyal status by performing delivery tasks over a predefined number. Until the occasional delivery worker 224B reaches the loyal status, rolling status is assigned to the occasional delivery worker 224B.

In step 350, transportation system 107 may assign the retrieved permanent delivery workers 224A to the retrieved delivery tasks from step 320. Transportation system 107 may assign the determined number of permanent delivery workers 224A to a delivery task. However, transportation system 107 may assign a number less than the determined number from step 330 based on availability of the retrieved permanent delivery workers 224A.

In step 360, transportation system 107 may assign the retrieved occasional delivery workers 224B to the retrieved delivery tasks after the permanent delivery worker assignments in step 350. Transportation system 107 may calculate a volume of remaining parcels after the permanent delivery worker assignments in step 350.

The calculation may comprise aggregating all feasible volumes of delivery parcels associated with the assigned permanent delivery workers to a delivery task and subtracting the aggregated feasible volume of delivery parcels from a volume of parcels associated with the delivery task. For example, transportation system 107 may determine, as discussed above, that three permanent delivery workers 224A should be assigned to a delivery task associated with 180 parcels (each permanent delivery worker associated with handling 50 parcels for delivery). Transportation system 107 may then determine that the remaining 30 remaining parcels should be assigned to temporary delivery workers. Transportation system 107 may then assign at least one retrieved occasional delivery worker 224B to a delivery task. In some embodiments, transportation system 107 does not assign an occasional delivery worker 224B to a delivery task when there are no remaining parcels. The occasional delivery worker assignments may comprise assigning an occasional delivery worker 224B to a delivery task when a delivery location associated with the delivery task is within a desired delivery location associated with the occasional delivery worker 224B. For example, transportation system 107 may assign two occasional delivery workers 224B to a delivery task associated with 30 remaining parcels, wherein each occasional delivery worker 224B is associated with 15 desired parcels for delivery and a delivery location associated with the delivery task is within each worker's desired delivery location.

Figure 4:
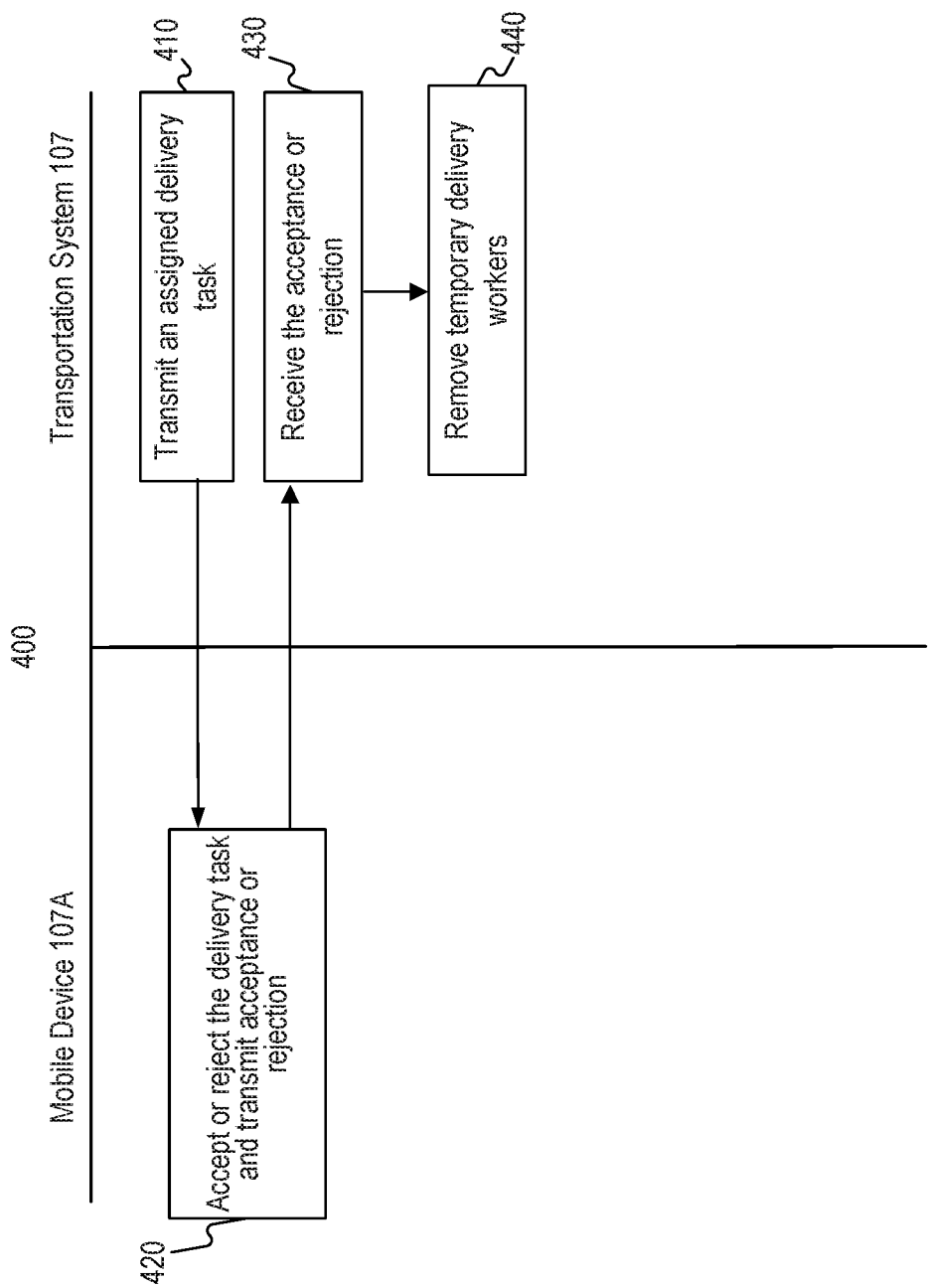
FIG. 4 is an exemplary flow chart of a process for confirming temporary delivery worker assignments, consistent with the disclosed embodiments.

Transportation system 107, after the assignments of temporary delivery workers in step 360, may confirm temporary delivery worker assignments. FIG. 4 is an exemplary flow chart of process 400 for confirming temporary delivery worker assignments, consistent with the disclosed embodiments. This exemplary process is provided by way of example. Process 400 shown in FIG. 4 can be executed or otherwise performed by one or more combinations of various systems, but the preferred embodiment comprises executing process 400 on transportation system 107. Each block shown in FIG. 4 represents one or more processes, methods, or subroutines in the exemplary method 400. Referring to FIG. 4, exemplary method 300 may begin at block 410.

In step 410, transportation system 107 may transmit an assigned delivery task to a mobile device 107A of a delivery worker 224B. For example, transportation system 107 may transmit a user interface providing a delivery location and a volume of parcels associated with a delivery task to a mobile device 107A-C of a delivery worker 224B.

In step 420, mobile device 107A of the delivery worker 224B may accept or reject the received delivery task sent in step 410 and transmit acceptance or rejection of the delivery offers by a user input on a user interface in the mobile device 107A to the transportation system 107. For example, mobile device 107A may transmit acceptance of the delivery task by capturing user input to transportation system 107.

In step 430, transportation system 107 may receive acceptance or rejection of the delivery task from mobile device 107A. For example, transportation system 107 may receive an acceptance, including a delivery related information, from a mobile application running on mobile device 107A.

In step 440, transportation system 107 may remove the assigned temporary delivery workers from the database if the assigned temporary delivery worker accepted a delivery task. By removing the assigned delivery worker, transportation system 107 does not consider the assigned delivery worker as delivery workers needing delivery tasks.

While the present disclosure has been shown and described with reference to particular embodiments thereof, it will be understood that the present disclosure can be practiced, without modification, in other environments. The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. Various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. An automatic delivery task assignment method for temporary delivery workers, comprising:
    receiving a request to determine delivery tasks for temporary delivery workers from a user device;
    retrieving delivery tasks needing assignments from a database, each delivery task associated with a delivery location and a volume of parcels;
    determining a number of permanent delivery workers needed based on a volume of parcels associated with each delivery task, by:
        dividing a volume of parcels associated with each delivery task by a feasible volume of delivery parcels associated with a permanent delivery worker, the feasible volume being identical for all permanent delivery workers;
    retrieving permanent delivery workers and temporary delivery workers needing assignments from the database, each delivery worker associated with a feasible volume of delivery parcels;
    assigning a first number of the retrieved permanent delivery workers to the retrieved delivery tasks, the first number based on the determined result of the division; and
    assigning the retrieved temporary delivery workers to the retrieved delivery tasks needing assignment after the permanent delivery worker assignments, the retrieved delivery tasks comprising a second number of delivery parcels, the second number based on a determined remainder of the division; and
    transmitting instructions to at least one mobile device, wherein the instructions cause the at least one mobile device to display an assigned delivery task.

2. The method of claim 1, further comprising receiving an acceptance of the delivery task from the at least one mobile device.

3. The method of claim 1, wherein assigning the retrieved permanent delivery workers further comprises assigning the determined number of permanent delivery workers to a delivery task.

4. The method of claim 1, wherein automatically assigning the retrieved temporary delivery workers further comprises:
    determining a volume of remaining parcels for each delivery task after the permanent delivery worker assignments; and
    assigning at least one retrieved temporary delivery worker to a delivery task when the calculated volume of remaining parcels of the delivery task is greater than zero.

5. The method of claim 4, wherein calculating a volume of remaining parcels after the assignment further comprises:
    aggregating all feasible volumes of delivery parcels associated with the assigned permanent delivery workers to the delivery task; and
    subtracting the aggregated feasible volume of delivery parcels from a volume of parcels associated with the delivery task.

6. The method of claim 4, wherein assigning at least one retrieved temporary delivery worker further comprises assigning the retrieved temporary delivery worker to a delivery task when a delivery location associated with the delivery task is within a desired delivery location associated with the temporary delivery worker.

7. The method of claim 1, further comprising removing the assigned permanent delivery workers and the assigned temporary delivery workers from the database.

8. The method of claim 1, wherein each temporary delivery worker is associated with a status of loyal, new, and rolling, and further wherein assigning the retrieved temporary delivery workers further comprises:
    determining whether available temporary delivery workers comprise a loyal delivery worker;
    assigning a loyal delivery worker to a delivery task when it is determined that available temporary delivery workers comprise a loyal delivery worker;
    determining whether available temporary delivery workers comprise a new delivery worker when it is determined that available temporary delivery workers do not comprise a loyal delivery worker;
    assigning a new delivery worker to a delivery task when it is determined that available temporary delivery workers comprise a new delivery worker;
    determining whether available temporary delivery workers comprise a rolling delivery worker when it is determined that available temporary delivery workers do not comprise a new delivery worker; and
    assigning a rolling delivery worker to a delivery task when it is determined that available temporary delivery workers comprise a rolling delivery worker.

9. The method of claim 1, wherein the delivery location includes one or more neighboring parcel destinations for an efficiency of assigned delivery worker.

10. An automated delivery task assignment system, comprising:
one or more memory devices storing instructions; and
one or more processors configured to execute the instructions to perform operations comprising
receiving a request to determine delivery tasks for temporary delivery workers from a user device;
retrieving delivery tasks needing assignments from a database, each delivery task associated with a delivery location and a volume of parcels;
determining a number of permanent delivery workers needed based on a volume of parcels associated with each delivery task, by:
dividing a volume of parcels associated with each delivery task by a feasible volume of delivery parcels associated with a permanent delivery worker, the feasible volume being identical for all permanent delivery workers;
retrieving permanent delivery workers and temporary delivery workers needing assignments from the database, each delivery worker associated with a feasible volume of delivery parcels;
assigning a first number of the retrieved permanent delivery workers to the retrieved delivery tasks, the first number based on the determined result of the division; and
assigning the retrieved temporary delivery workers to the retrieved delivery tasks needing assignment after the permanent delivery worker assignments, the retrieved delivery tasks comprising a second number of delivery parcels, the second number based on a determined remainder of the division; and
transmitting instructions to at least one mobile device, wherein the instructions cause the at least one mobile device to display an assigned delivery task.

11. The system of claim 10, wherein the one or more processors are further configured to receive an acceptance of the delivery task from the at least one mobile device.

12. The system of claim 10, wherein assigning the retrieved permanent delivery workers further comprises assigning the determined number of permanent delivery workers to a delivery task.

13. The system of claim 10, wherein automatically assigning the retrieved temporary delivery workers further comprises:
determining a volume of remaining parcels for each delivery task after the permanent delivery worker assignments; and
assigning at least one retrieved temporary delivery worker to a delivery task when the calculated volume of remaining parcels of the delivery task is greater than zero.

14. The system of claim 13, wherein calculating a volume of remaining parcels after the assignment further comprises:
aggregating all feasible volumes of delivery parcels associated with the assigned permanent delivery workers to the delivery task; and
subtracting the aggregated feasible volume of delivery parcels from a volume of parcels associated with the delivery task.

15. The system of claim 13, wherein assigning at least one retrieved temporary delivery worker further comprises assigning the retrieved temporary delivery worker to a delivery task when a delivery location associated with the delivery task is within a desired delivery are associated with the temporary delivery worker.

16. The system of claim 10, further comprising removing the assigned permanent delivery workers and the assigned temporary delivery workers from the database.

17. The system of claim 10, wherein each temporary delivery worker is associated with a status of loyal, new, and rolling, and further wherein assigning the retrieved temporary delivery workers further comprises
determining whether available temporary delivery workers comprise a loyal delivery worker;
assigning a loyal delivery worker to a delivery task when it is determined that available temporary delivery workers comprise a loyal delivery worker;
determining whether available temporary delivery workers comprise a new delivery worker when it is determined that available temporary delivery workers do not comprise a loyal delivery worker;
assigning a new delivery worker to a delivery task when it is determined that available temporary delivery workers comprise a new delivery worker;
determining whether available temporary delivery workers comprise a rolling delivery worker when it is determined that available temporary delivery workers do not comprise a new delivery worker; and
assigning a rolling delivery worker to a delivery task when it is determined that available temporary delivery workers comprise a rolling delivery worker.

18. The system of claim 10, wherein the delivery location includes one or more neighboring parcel destinations for an efficiency of assigned delivery worker.

19. A non-transitory computer-readable medium storing instructions to execute a method by a processor to assign a delivery task automatically, the method comprising:
receiving a request to determine delivery tasks for temporary delivery workers from a user device;
retrieving delivery tasks needing assignments from a database, each delivery task associated with a delivery location and a volume of parcels;
determining a number of permanent delivery workers needed based on a volume of parcels associated with each delivery task, by:
dividing a volume of parcels associated with each delivery task by a feasible volume of delivery parcels associated with a permanent delivery worker, the feasible volume being identical for all permanent delivery workers;
retrieving permanent delivery workers and temporary delivery workers needing assignments from the database, each delivery worker associated with a feasible volume of delivery parcels;
assigning a first number of the retrieved permanent delivery workers to the retrieved delivery tasks, the first number based on the determined result of the division; and
assigning the retrieved temporary delivery workers to the retrieved delivery tasks needing assignment after the permanent delivery worker assignments, the retrieved delivery tasks comprising a second number of delivery parcels, the second number based on a determined remainder of the division; and
transmitting instructions to at least one mobile device, wherein the instructions cause the at least one mobile device to display an assigned delivery task.

20. The non-transitory computer-readable medium of claim 19, wherein assigning the retrieved temporary workers further comprises:

determining a volume of remaining parcels for each delivery task after the permanent delivery worker assignments; and assigning at least one retrieved temporary worker to a delivery task when the calculated volume of remaining parcels of the delivery task is greater than zero.

\* \* \* \* \*